US 6,532,894 B2

(12) United States Patent
Johnson

(10) Patent No.: US 6,532,894 B2
(45) Date of Patent: Mar. 18, 2003

(54) ANTI-SQUIRREL AND RODENT ATTACHMENT KIT

(76) Inventor: Raymond P. Johnson, 6926 Browns Quarry Rd., Sabillasville, MD (US) 21780

(*) Notice: Subject to any disclaimer, the term of this patent is extended or adjusted under 35 U.S.C. 154(b) by 0 days.

(21) Appl. No.: 09/797,151

(22) Filed: Mar. 1, 2001

(65) Prior Publication Data

US 2001/0032593 A1 Oct. 25, 2001

Related U.S. Application Data

(60) Provisional application No. 60/189,666, filed on Mar. 15, 2000.

(51) Int. Cl.[7] .............................................. A01K 39/01
(52) U.S. Cl. ..................................... 119/52.3; 119/57.9
(58) Field of Search ............................... 119/52.3, 57.9, 119/52.2, 57.8, 468, 429, 430, 432, 433, 435

(56) References Cited

U.S. PATENT DOCUMENTS

| | | | | | |
|---|---|---|---|---|---|
| 1,075,255 | A | * | 1/1913 | Helm | 47/32.4 |
| 1,879,813 | A | * | 1/1932 | Molitor | 47/32.4 |
| 4,031,856 | A | * | 6/1977 | Chester | 119/57.9 |
| 4,899,486 | A | * | 2/1990 | Hurlstone | 47/30 |
| 5,156,112 | A | * | 10/1992 | Brown | 119/57.8 |
| 5,394,641 | A | * | 3/1995 | Danca | 119/52.3 |
| 5,581,935 | A | * | 12/1996 | Anderson | 47/32 |
| 5,782,041 | A | * | 7/1998 | Filipescu | 52/101 |
| 5,867,953 | A | * | 2/1999 | Amundsen | 52/146 |
| 5,878,537 | A | * | 3/1999 | Flischel | 119/52.3 |
| 6,024,048 | A | * | 2/2000 | Potente | 119/52.3 |
| 6,226,933 | B1 | * | 5/2001 | Nelson et al. | 43/124 |

* cited by examiner

*Primary Examiner*—Yvonne Abbott
(74) *Attorney, Agent, or Firm*—John D. Gugliotta

(57) ABSTRACT

An anti-squirrel device for pole mounted bird feeders consisting of a section of tubing slidably mounted around the pole suspended by an elastic band.

5 Claims, 1 Drawing Sheet

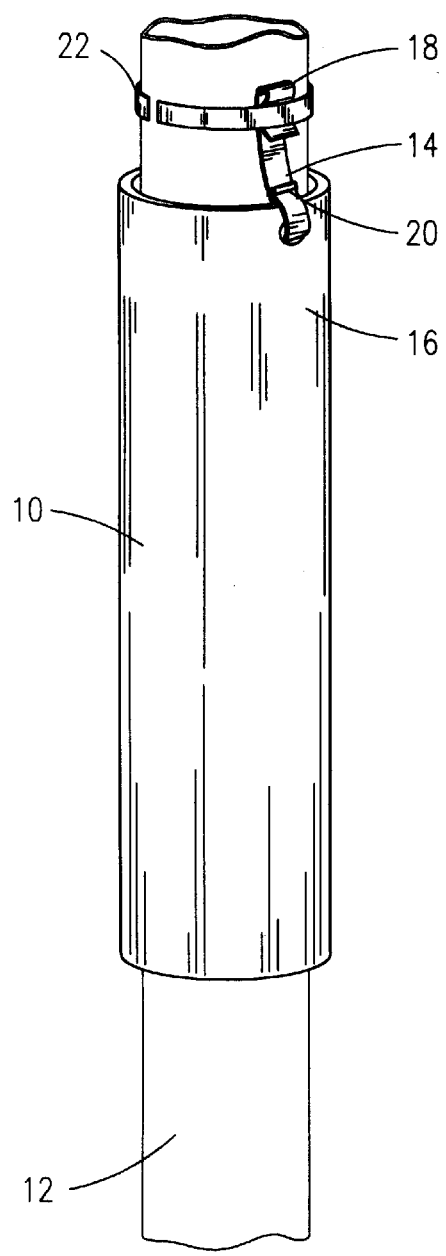
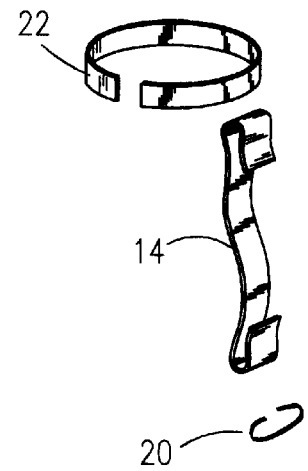
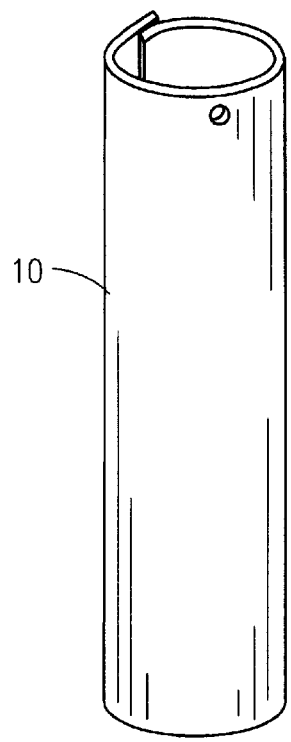
*Figure 1*
*Figure 2*

ANTI-SQUIRREL AND RODENT ATTACHMENT KIT

RELATED APPLICATIONS

The present invention is a continuation of U.S. Provisional Patent No. 60/189,666 filed on Mar. 15 2000.

BACKGROUND OF THE INVENTION

1. Field of the Invention

The present invention relates generally to squirrel proof bird feeders and anti-squirrel guards and the like and, more particularly, to an anti-squirrel device for pole mounted bird feeders consisting of a section of tubing slidably mounted around the pole suspended by an elastic band.

2. Description of the Related Art

Many people enjoy the presence of birds on their property and, in order to attract them, place pole-mounted bird feeders in their yards. These feeders not only attract the birds, but they also serve as a food source in the winter months when the birds' natural food sources are in short supply. However, these feeders are susceptible to raiding by animals other than birds, especially squirrels. The squirrels not only eat from the feeders, they, being gatherers, usually take all of the food and store it for themselves, leaving none for the birds who need it most.

A search of the prior art did not disclose any patents that read directly on the claims of the instant invention; however, the following references were considered related in that they describe the design and function of a squirrel-proof bird feeder:

U.S. Pat. No. 5,921,201 issued in the name of Green
U.S. Pat. No. 5,690,056 issued in the name of Korb
U.S. Pat. No. 5,678,507 issued in the name of Kassner
U.S. Pat. No. 5,676,089 issued in the name of Morganson
U.S. Pat. No. 5,375,558 issued in the name of Drakes
U.S. Pat. No. 5,309,867 issued in the name of Cruz
U.S. Pat. No. 5,285,748 issued in the name of Weldin
U.S. Pat. No. 4,821,681 issued in the name of Tucker
U.S. Pat. No. 4,323,035 issued in the name of Piltch
U.S. Pat. No. 4,030,451 issued in the name of Miller
U.S. Pat. No. 2,918,801 issued in the name of Poulsen
U.S. Pat. No. 2,896,575 issued in the name of Scruggs
U.S. Pat. No. D 360,496 issued in the name of Norman Consequently, the need has arisen for a solution to this problem that allows for bird feeding while preventing access to the feeder by squirrels and other animals.

SUMMARY OF THE INVENTION

It is therefore an object of the present invention to provide an improved squirrel proof bird feeders and anti-squirrel guards.

It is a feature of the present invention to provide an improved anti-squirrel device for pole mounted bird feeders consisting of a section of tubing slidably mounted around the pole suspended by an elastic band.

Briefly described according to one embodiment of the present invention, an apparatus is provided that prevents access to a pole mounted bird feeders by squirrels. It consists of a round, plastic tube, approximately twelve inches in length that is slid over the feeder pole, as provided by others. The tube is supported with the use of a ruber sling, consisting of a piece of rubber approximately one quarter of an inch wide by ten inches long. The rubber sling is secured to the feeder pole by the use of a clip and secured to the round tube by the use of a fastener. Thus, when and if a squirrel should try to climb the pole, when it encounters the invention, and attempts to climb over its exterior, it will simply drop to the bottom as the rubber sling stretches to accommodate the squirrel's weight.

An advantage of the present invention is that its use allows people the opportunity to feed birds without worrying about squirrels consuming the bird food.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a perspective view of an anti-squirrel and rodent attachment kit according to the present invention shown installed on a bird feeder pole; and FIG. 2 is an exploded perspective view thereof.

DESCRIPTION OF THE PREFERRED EMBODIMENTS

The best mode for carrying out the invention is presented in terms of its preferred embodiment, herein depicted within the Figures.

1. Detailed Description of the Figures

Referring now to FIGS. 1 and 2, an anti-squirrel and rodent attachment kit is shown, according to the present invention, comprised of a one-piece plastic cylinder 10 of a linearly elongated configuration have a top opposite a bottom and vertically split along the entire linear length of the cylinder sidewall. Designed to prevent squirrels and other rodents from entering a pole mounted bird feeder and stealing the food, it is anticipated that two different diameter measurements be available, namely ¾ inch and 1¼ inch for accommodating pole sizes measuring from ½ inch to 1 inch. The plastic cylinder 10 is further designed so as to be snapably received by a pole 12, the pole 12 being of the type utilized for a conventional pole-mounted bird feed (not shown).

A rubber sling 14 having a first end 16 and a second end 18 and measuring ¼ inch by 10 inches is secured to the top of the external circumferential surface of the plastic cylinder 10 by a fastener 20, such as a heavy-duty clip, and the rubber sling's first end 16. The second end 18 of the rubber sling 14 is secured to the pole 12 by a fastener 22. The means for fastening the rubber sling 14 to the plastic cylinder 10 as disclosed is only meant as a suggestion and is by no means limiting, and is shown as a spring clip fastener.

2. Operation of the Preferred Embodiment

In operation, the plastic cylinder 10, being supported by the rubber sling 14 stretches downward upon receiving the weight of a squirrel which has climbed thereupon. As the plastic cylinder 10 stretches to ground level, the squirrel is plummeted to the ground, and the plastic cylinder 10 springably returns to its resting position with the squirrel having been denied access to the bird feeder.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. An anti-squirrel and rodent attachment kit comprising:

a plastic cylinder;

a rubber sling, said rubber sling having a first end and a second end, said first end affixed to said plastic cylinder;

securing means for attaching said second end to an otherwise conventional pole used to mount an otherwise conventional bird feeder.

2. The anti-squirrel and rodent attachment kit of claim 1, wherein said plastic cylinder is designed to be received by said pole in a removably attachable manner.

3. The anti-squirrel and rodent attachment kit of claim 2, wherein said plastic cylinder is approximately 12 inches in length.

4. The anti-squirrel and rodent attachment kit of claim 1, wherein said rubber sling measures approximately 10 inches in length.

5. The anti-squirrel and rodent attachment kit of claim 1, wherein said securing means comprises a spring clip fastener.

* * * * *